United States Patent
Ghavami et al.

(10) Patent No.: US 7,065,149 B2
(45) Date of Patent: Jun. 20, 2006

(54) TRANSMITTER, THE METHOD OF THE SAME AND COMMUNICATION SYSTEM

(75) Inventors: Mohammad Ghavami, Tokyo (JP); Robert Morelos-Zaragoza, Tokyo (JP)

(73) Assignee: Sony Corporation, Tokyo (JP)

( * ) Notice: Subject to any disclaimer, the term of this patent is extended or adjusted under 35 U.S.C. 154(b) by 840 days.

(21) Appl. No.: 10/184,688

(22) Filed: Jun. 27, 2002

(65) Prior Publication Data

US 2003/0021354 A1 Jan. 30, 2003

(30) Foreign Application Priority Data

Jun. 29, 2001 (JP) ............................. 2001-200210

(51) Int. Cl.
*H04B 7/02* (2006.01)
*H04L 1/02* (2006.01)

(52) U.S. Cl. .................... 375/267; 375/224; 375/299; 455/101

(58) Field of Classification Search ................ 375/224, 375/260, 267, 299; 455/63.4, 101, 562.1; 343/703, 893
See application file for complete search history.

(56) References Cited

U.S. PATENT DOCUMENTS

| 5,576,717 | A | * | 11/1996 | Searle et al. | 342/373 |
| 5,752,173 | A | * | 5/1998 | Tsujimoto | 455/137 |
| 5,894,598 | A | * | 4/1999 | Shoki | 455/562.1 |
| 6,070,090 | A | * | 5/2000 | Feuerstein | 455/561 |
| 6,173,014 | B1 | * | 1/2001 | Forssen et al. | 375/267 |
| 6,289,005 | B1 | * | 9/2001 | Katz | 370/328 |
| 6,377,783 | B1 | * | 4/2002 | Lo et al. | 455/101 |
| 6,553,012 | B1 | * | 4/2003 | Katz | 370/328 |
| 6,643,526 | B1 | * | 11/2003 | Katz | 455/562.1 |
| 6,754,467 | B1 | * | 6/2004 | Ide et al. | 455/25 |
| 6,845,244 | B1 | * | 1/2005 | Ide et al. | 455/506 |

* cited by examiner

*Primary Examiner*—Jean B. Corrielus
(74) *Attorney, Agent, or Firm*—Finnegan, Henderson, Farabow, Garrett & Dunner, L.L.P.

(57) ABSTRACT

A transmitter, the method of the same, and a communication system using the scheme of space-time block coding employing the multiple beams to mitigate the multipath fading. A transmitter constituted array antennas first performs beams scanning employing beamforming network for estimating the channel space gain pattern, then estimates number of the beams for transmission and the corresponding angles of each beam, performs beam space-time block encoding of input signals then transmitting the encoded signals. The receiver receives the signal and performs linear channel decoding, for example, maximum likelihood decoding.

11 Claims, 14 Drawing Sheets

| PARAMETER | VALUE |
|---|---|
| L | 9-35 (UNIFORM) |
| $d_0$ | 1-100 (UNIFORM) |
| $H_{th}$ | 10, 13, 16 |

TRANSMITTER, THE METHOD OF THE SAME AND COMMUNICATION SYSTEM

BACKGROUND OF THE INVENTION

1. Field of the Invention

The present invention relates to a transmitter, the method of the same, and a communication system.

2. Description of the Related Art

Multipath fading is a phenomenon that makes reliable wireless transmission difficult. Diversity combining techniques combine the signals from multipath antennas is a way that mitigates fading. In most scattering environments, antenna diversity is a practical, effective and hence a widely applied technique. The classical approach is to use multiple antenna at the receiver and perform combining or selection and switching in order to improve the quality of the received signals.

In recent researches, space-time block coding using multiple antennas has been studied, and space-time codes have been introduced to improve the performance of mobile communication systems.

On the other hand, adaptive beamforming using antenna arrays has been widely used to reduce interference and mitigate multipath fading, hence improve the capacity. Adaptive arrays cancel multipath components of the desired signal and null interfering signals that have different directions of arrival from the desired signal. An extension of the space-time transmit diversity approach to the case of beamforming using two distinct beams was proposed in a paper of Katz, M., J. Ylitalo, "Extension of space-time coding to beamforming WCDMA base stations", in Proc. IEEE VTC' 2000-Spring, pp.1230–1234, May 2000. It was shown that, when transmitting with two space-time encoded beams, the downlink performance is improved compared to the conventional single beam and two antenna transmitting scheme.

As described above, in conventional researches space-time block coding using multiple antennas and adaptive beamforming using antenna arrays for mitigating multipath fading have been developed separately.

SUMMARY OF THE INVENTION

The present invention was made in consideration with such a circumstance and has as an object thereof to provide a transmitter, a communication system and the method of the same, which using a newly developed technique for mitigating multipath fading with a combination of the space-time block coding using multibeam and the adaptive beamforming using antenna array to generating multiple beams.

To achieve to above object, according to a first aspect of the present invention, there is provided a transmitter for transmitting a signal in a multipath environment, comprising an array antenna includes a plurality of antenna elements, a first estimating means for estimation the channel spatial gain pattern according to the output power of the beam-forming network of the array antenna, a second estimating means for estimating the number of beams and angles of each beam for transmitting the signals according to the estimated channel spatial gain pattern, and an encoding means performing channel coding of the signals to be transmitted and transmitting the encoded signals through the array antenna.

According to a second aspect of the present invention, there is provided a method for transmitting a signal by using a transmitter including an array antenna from a base station to a mobile station, comprising a first step for estimating the channel spatial gain pattern according to the output power of the beam-forming network of the array antenna, a second step for estimating the number of beams and angles of each beam for transmitting the signals according to the estimated channel spatial gain pattern, and a third step performing channel coding of the signals to be transmitted and transmitting the encoded signals through the array antenna.

Further, according to a third aspect of the present invention, there is provided a communication system comprising a transmitter including an array antenna constituted by a plurality of antenna elements, a first estimating means for estimation the channel spatial gain pattern according to the output power of the beam-forming network of the array antenna, a second estimating means for estimating the number of beams and angles of each beam for transmitting the signals according to the estimated channel spatial gain pattern, and an encoding means performing channel coding of the signals to be transmitted and transmitting the encoded signals through the array antenna, and a receiver including a decoding means performing channel decoding of the received signal.

Preferably, in the present invention, the second estimating means of the transmitter estimates the number of the beams in accordance with the number of the multipath components of the channel and the gain threshold.

Preferably, in the present invention, the encoding means of the transmitter performs space-time block coding with using multiple beams of the array antenna.

Preferably, in the present invention, the decoding means of the receiver decodes the received signal by beam space-time block decoding.

Furthermore, in the present invention, preferably, the decoding means of the receiver decodes the received signal by maximum likelihood decoding algorithm.

BRIEF DESCRIPTION OF THE DRAWINGS

These and other objects and features of the present invention will become clearer from the following description of the preferred embodiments given with reference to the accompanying drawings, in which.

DESCRIPTION OF THE PREFERRED EMBODIMENTS

Below, preferred embodiments will be described with reference to the accompanying drawings.

Figure 1:
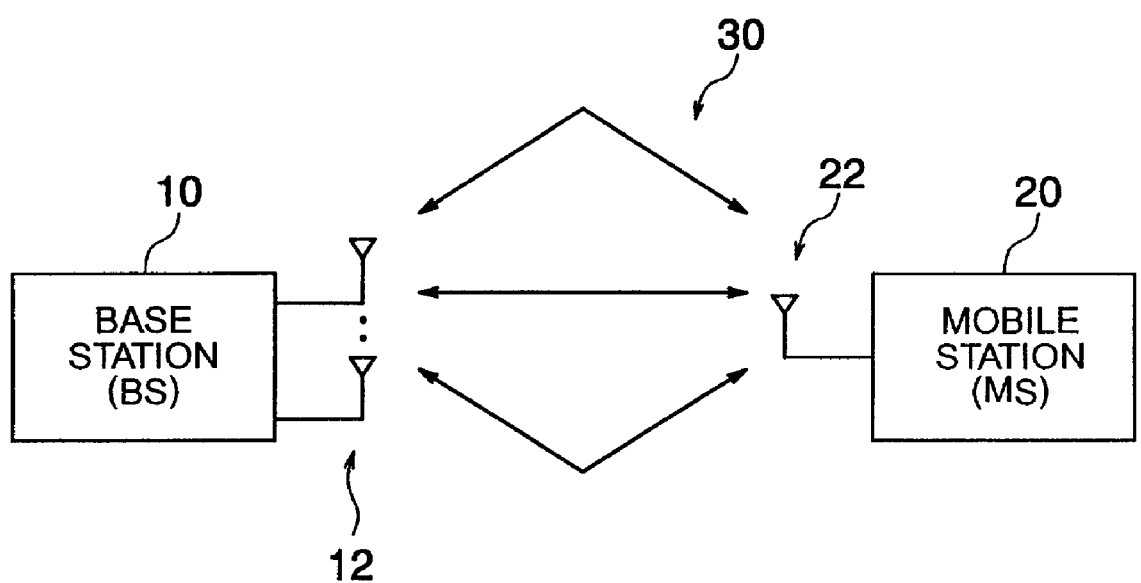
FIG. 1 is a diagram showing the construction of an embodiment of the communication system according to the present invention.

FIG. 1 shows a block diagram of a simplified configuration of a communication system according to an embodiment of the present invention. As illustrated, the communication system is constituted by a base station (BS) 10 and a mobile station (MS) 20 connected by, for example, a wireless channel 30. The BS 10 uses an antenna array 12 for transmitting and receiving signals, while the MS 20 uses a single antenna for transmitting and receiving signals. The single antenna used by MS 20 is, for example, an omnidirectional antenna. In an indoor wireless data communication network, the channel 30 between the BS 10 and the MS 20 is multipath fading, that is, signals are transmitted through multiple path between the BS 10 and the MS 20 because of the scattering environment of the indoor wireless channel.

The array antenna used by the BS 10 is, for example, an array constituted by a plurality of antenna elements. Adaptive beamforming can be achieved by properly setting the weight of each element of the array. In the present embodiment, the BS 10 sends signals encoded with space-time block coding using multiple beams. Hereinafter, the space-time block coding using multiple beams is referred to as beam space-time block coding (BSTB coding). The MS 20 receives the signals encoded with BSTB coding and decodes the received signals with linear decoding algorithm, for example, maximum likelihood decoding algorithm to mitigate multipath fading.

In an indoor wireless data communication system, a base station transmits signals to a plurality of mobile stations through downlink channel, while each mobile station transmits signals to the base station through uplink channel. In a practical application, the plurality of mobile stations are distributed around the base station.

Figure 2A:
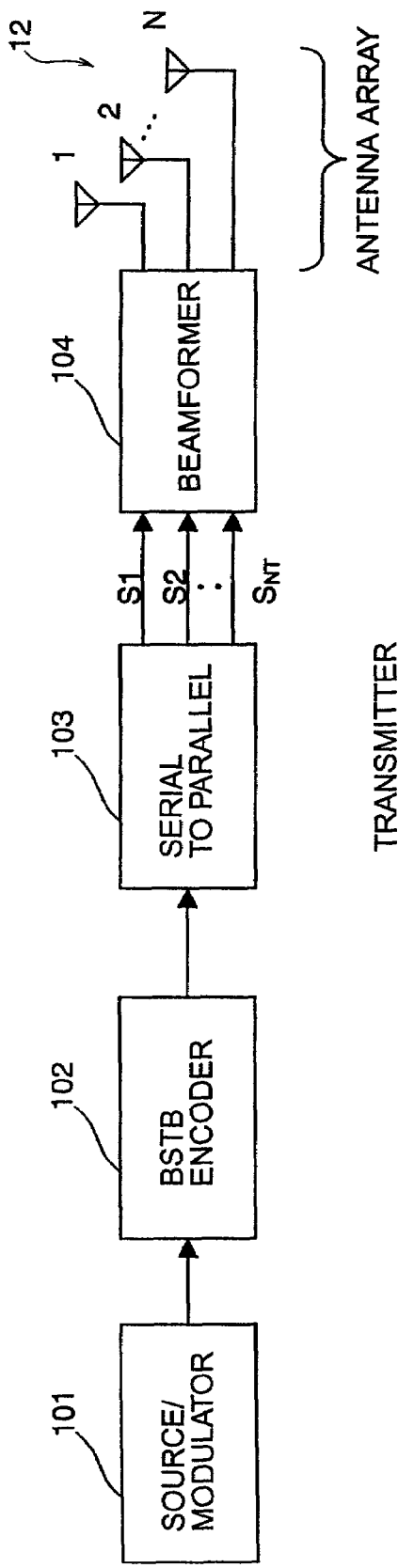
FIGS. 2A and 2B are diagrams showing the configuration of the base station and the mobile station for downlink communication.
Figure 2B:
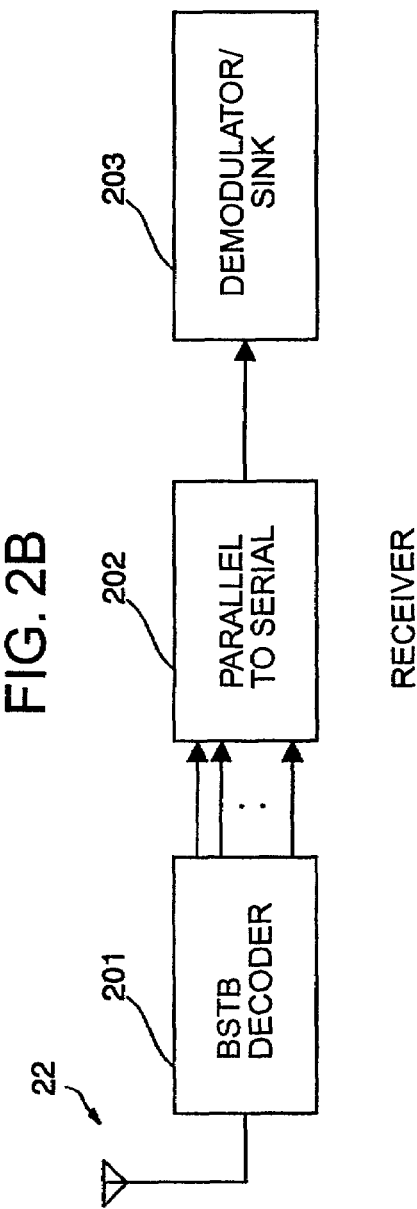

FIGS. 2A and 2B show the configuration of the base station and the mobile station for downlink communication in the communication system of the present embodiment. In downlink transmission, the base station operates as a transmitter and the mobile station operates as a receiver. As illustrated in FIG. 2A, the transmitter is constituted by a source/modulator 101, a BSTB encoder 102, a serial to parallel converter 103 and a beamformer 104. As illustrated in FIG. 2B, the receiver is constituted by a BSTB decoder 201, a parallel to serial converter and a demodulator/sink 203.

Below, an explanation of the operation of each part of the transmitter and the receiver will be given with reference to FIGS. 2A and 2B.

In the transmitter, the source/modulator 101 performs modulation of a source signal and sends a modulated signal to the BSTB encoder 102.

The BSTB encoder 102 performs BSTB coding for the input signal and sends the encoded signal to the serial to parallel converter 103.

The serial to parallel converter 103 converts the encoded signal, that is, the bit stream to parallel signals s1, s2, ..., $s_{N_T}$ and sends them to the beamformer 104.

The beamformer 104 performs beamforming for the input signals s1, s2, ..., $s_{N_T}$ and generates transmit signals for the array antenna 12.

In the receiver, the BSTB decoder 201 performs BSTB decoding of the received signal and output the decoded signals to the parallel to serial converter 202.

The parallel to serial converter 202 converts the parallel decoded signals to serial signal, that is, the bit stream and output this to the demodulator/sink 203.

The demodulator/sink 203 performs demodulation of the input bit stream to retrieve the source signal.

Figure 3:
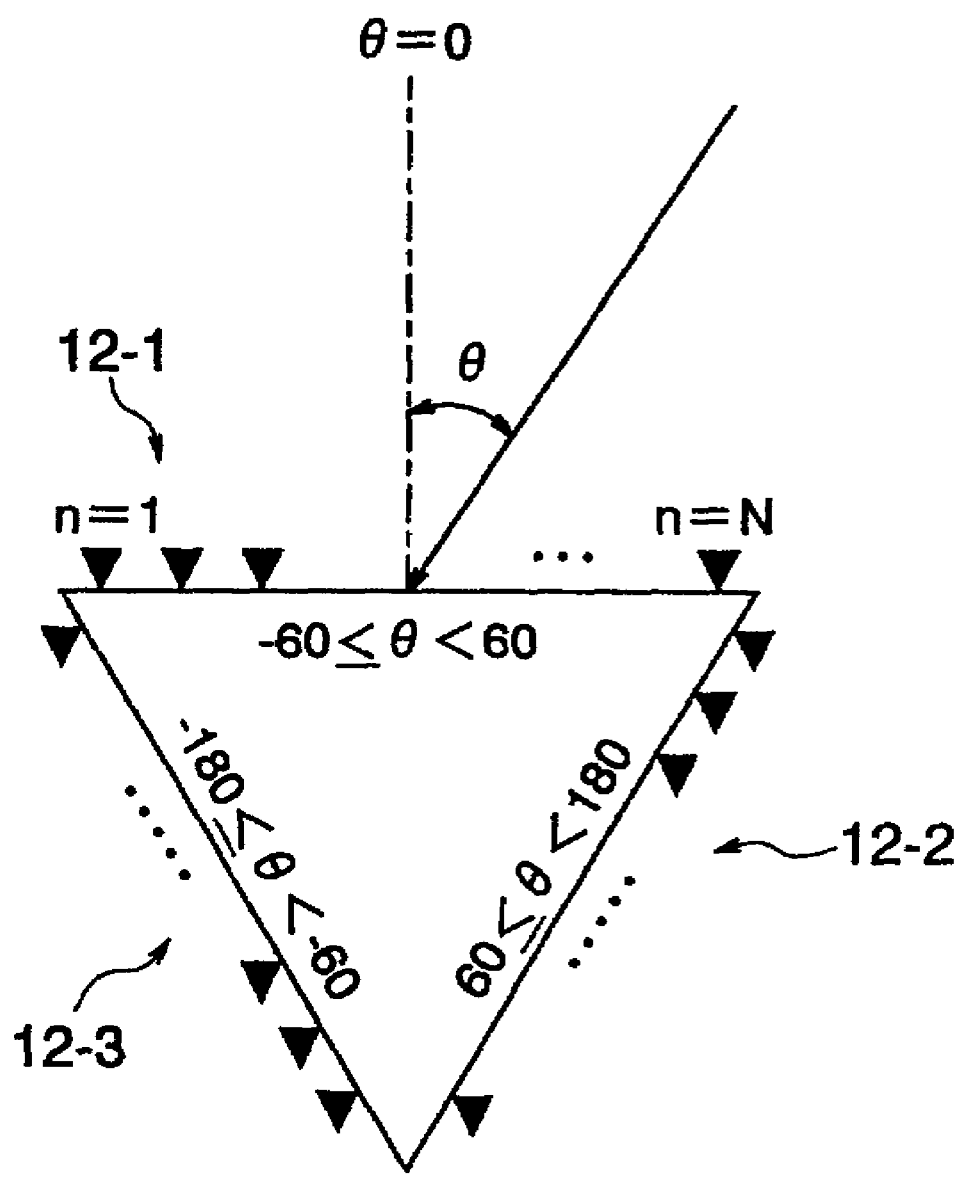
FIG. 3 is a diagram showing the configuration of the array antenna used in the base station.

FIG. 3 is a simplified diagram of a 360 degrees narrow band beamformer which is employed at the base station for estimation of the arrival angles.

As illustrated in FIG. 3, the beamformer is constituted by three array antennas each comprising N number of antenna elements. The three array antennas are geometrically located as a triangle. In these array antennas, each antenna element is connected to a complex weight $w_n$, $1 <= n <= N$, where N is the number of the elements in each of the array antenna. During reception, the weighted signals are summed together making an output signal as follows.

$$y(t) = \sum_{n=1}^{N} w_n x\left(t - (n-1)\frac{d}{c}\sin\theta\right) \quad (1)$$

where x(t) is the received signal at the first element, d is the distance between elements, c is the propagation speed of the signal and θ is the angle of arrival (AOA). For the main array antenna, that is, the array 12-1 shown in FIG. 3, −60 degrees<=θ<60 degrees. Other two array antennas, that is, the array antenna 12-2 operating for 60 degrees<=θ<180 degrees and the array antenna 12-3 operating for −180 degrees<=θ<−60 degrees, are essentially the same as the main array antenna 12-1 and hence, the attention is only paid to the main array antenna 12-1.

In frequency domain, equation (1) can be written as follows:

$$Y(f, \theta) = \sum_{n=1}^{N} w_n X(f) e^{-j2\pi f(n-1)\frac{d}{c}\sin\theta} \quad (2)$$

or $$H(f, \theta) \triangleq \frac{Y(f, \theta)}{X(f)} \quad (3)$$

$$= \sum_{n=1}^{N} w_n e^{-j2\pi f(n-1)\frac{d}{c}\sin\theta}$$

For narrow band beamforming, f is a constant and θ is variable. For the beam to be directed toward the desired direction, $\theta_0$, the following equation can be obtained.

$$w_n = e^{j2\pi f(n-1)\frac{d}{c}\sin\theta_0} \quad (4)$$

That is, for $\theta=\theta_0$, equation (3) reduces to $$H(f,\theta_0)=N \quad (5)$$

Equation (5) shows a maximum amplitude attainable by beamforming using an array antenna with N number of elements.

Figure 4:
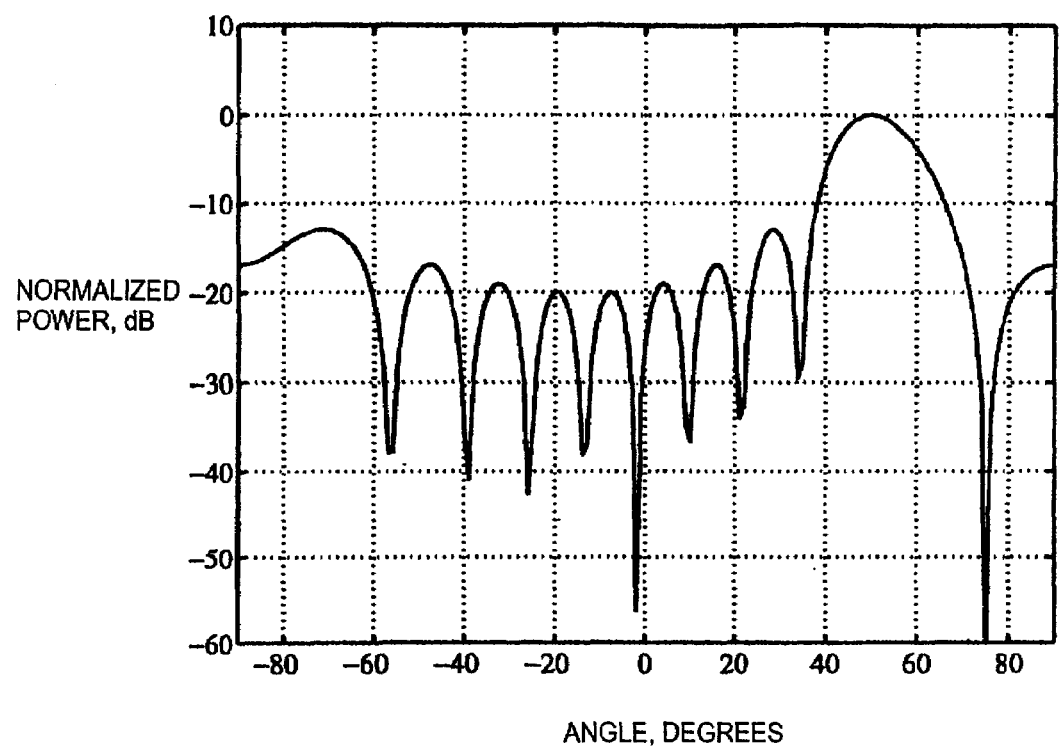
FIG. 4 is a plot showing an example of the beam pattern formed by the array antenna in the base station.

FIG. 4 shows an example of a normalized amplitude of $|H(f,\theta)|$ for $\theta_0=50$ degrees, N=10 c=3×10$^8$ m/s, f=5 GHz and d=c/2f=30 mm. Since the sharpness of the beams reduces considerably for $|\theta_0|>60$ degrees, in the present embodiment, the beam directional angle $\theta_0$ is limited as $|\theta_0|<60$ degrees.

Figure 5:
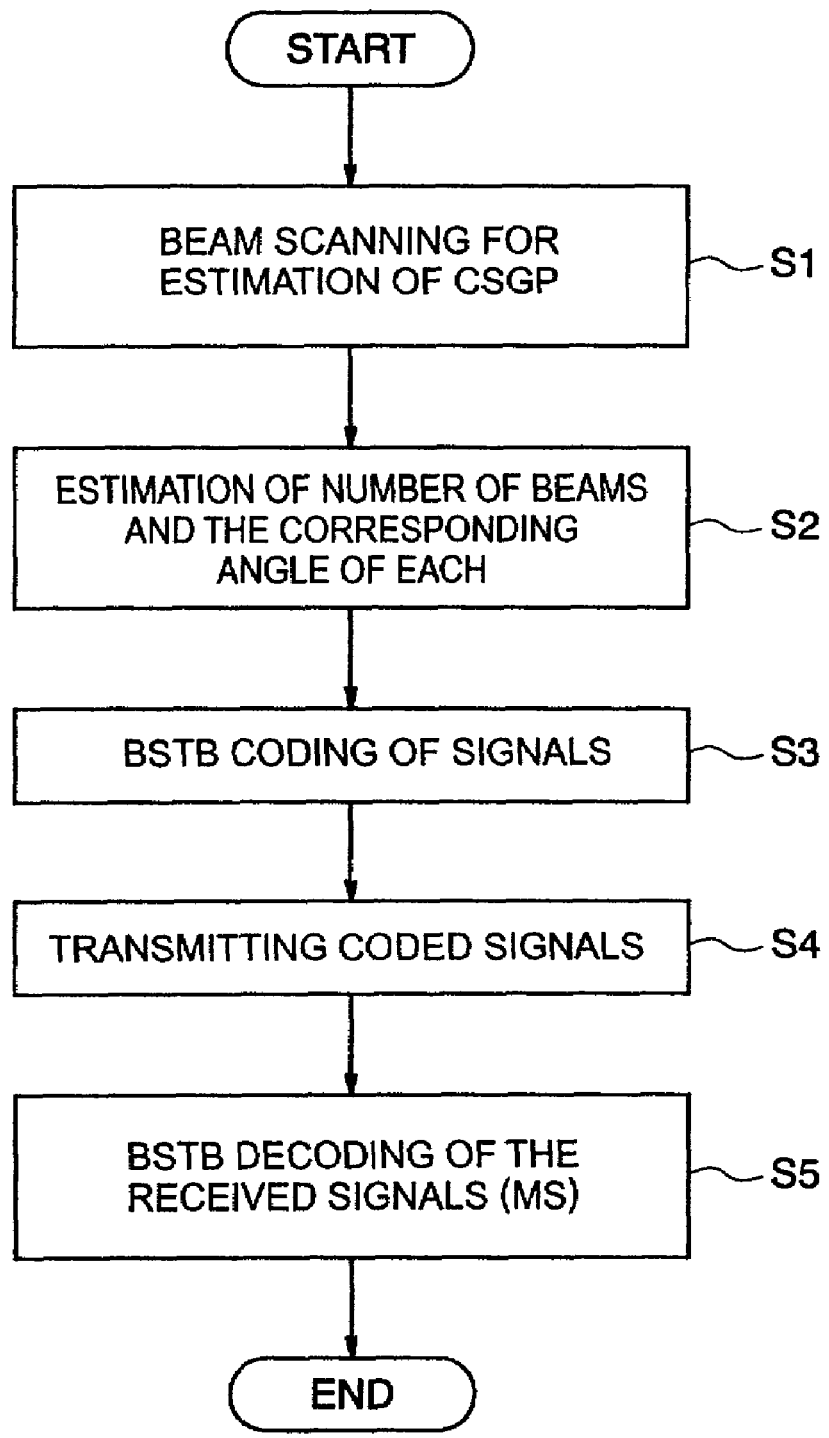
FIG. 5 is a flow chart showing the operations of the signal transmission in the base station.

FIG. 5 is a flow chart showing the operations of a communication system including the base station and the mobile station. The operations of steps S1 to S4 shown in this flow chart are performed by the base station, the operation of the step S5 is performed by the mobile station.

Below, an explanation of the operations of the communication system will be given with reference to FIG. 5.

As shown in FIG. 5, first, in step S1, beam scanning is performed for estimating the channel spatial gain pattern (CSGP).

Then in step S2, an estimation of the number of the beams and the corresponding angle of each beam is performed according to the outputs power of the beam scanning in step S1.

In step S3, beam space-time block coding (BSTB coding) of the signals and distribution of the decoded signals onto time slots for downlink transmission is performed.

In step S4, the decoded signals are transmitted by the array antenna according to the time slots for downlink transmission.

In step S5, at the mobile station, a beam space-time block decoding (BSTB decoding) of the received signals is performed.

Below, explanations of the operation of each step will be given in details.

Step S1: Beam scanning for estimation of CSGP

The beam scanning of the array antenna is performed by the beamforming network of the array antenna. As shown in equation (4), a set of coefficients $w_n$ can be calculated for each desired direction $\theta_0$ of the beam.

Figure 6:
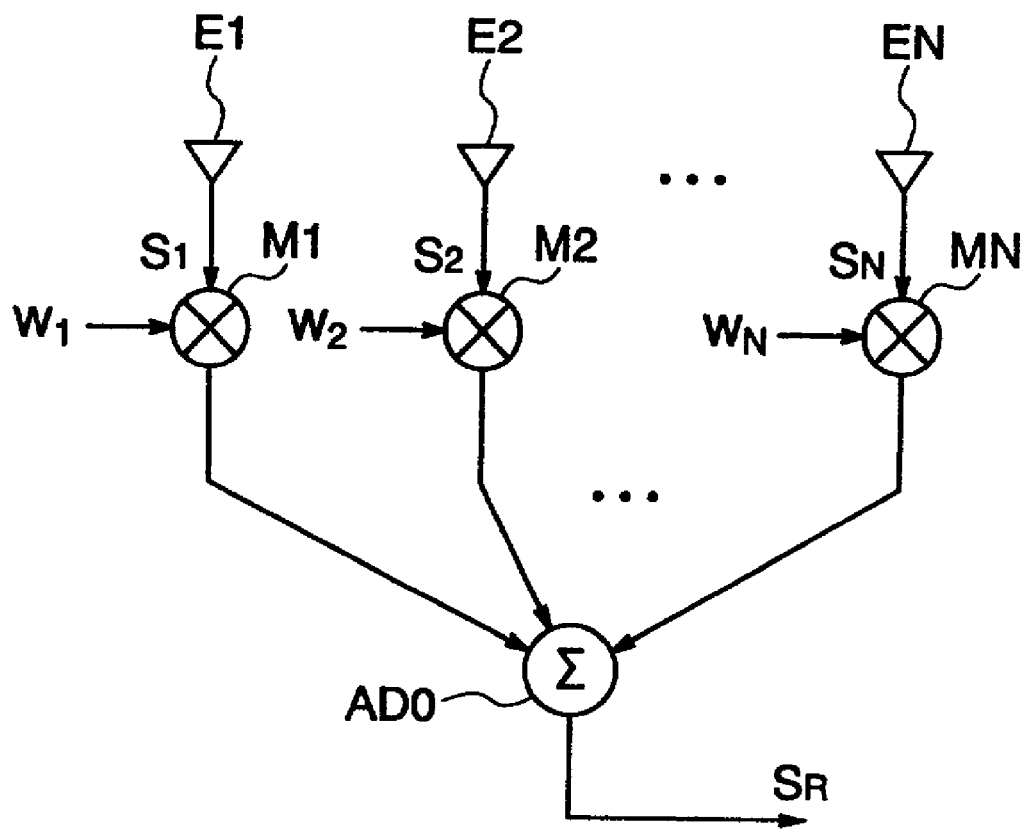
FIG. 6 is a diagram showing the array antenna and the signal processing for beamforming in the base station.

FIG. 6 is a diagram showing an example of an array antenna and the signal processing during beam scanning. As shown in FIG. 6, the array antenna is constituted by a plurality of antenna elements E1, E2, ..., EN each connected to a multiplier (M1, M2, ..., MN). During beam scanning, for each desired direction of beam, a set of coefficients (weights) $w_n$ is calculated according to equation (4) and input to each multiplier. The received signals of each antenna element is input to the corresponding multiplier and the result of the signal multiplied by the coefficient is output to the adder AD0. That is, the output $S_R$ of the adder AD0 indicates the received power of each AOA.

In the present embodiment, the estimation of CSGP is performed using a set of switched beams in three 120 degrees sectors. There are totally $N_b$ beams with a separation angle of $360/N_b$ degrees. The output power of each $N_b$ beam are used for determination of the number of beams required for downlink beamforming and their respective angles.

To include beamforming and the estimation of angular spread in the communication under consideration, a channel model is employed which creates not only a complex gain, but also the AOA for each path. This channel model is only used for the purpose of simulation and for producing incoming signals at the base station receiver array antenna.

One of the appropriate channel models is geometrically based single bounced (GBSB) model which is described in literature of Liberti, J. C. and T. S. Rappaport, "A geometrically based model for line-of-sight multipath channels" in Proc. IEEE ICUPC' 96, pp.844–848, 1996. The model is useful for micro-cell indoor wireless communication system with low transmitter and receiver antenna heights, and also code division multiplex access (CDMA) cellular radio systems applying adaptive antennas and switched beams systems at the base station. Parameters considered in this modeling are, separation between the transmitter and receiver, pass loss exponent, reference power, reflection loss and the number of multipath components.

Figures 7, 8:
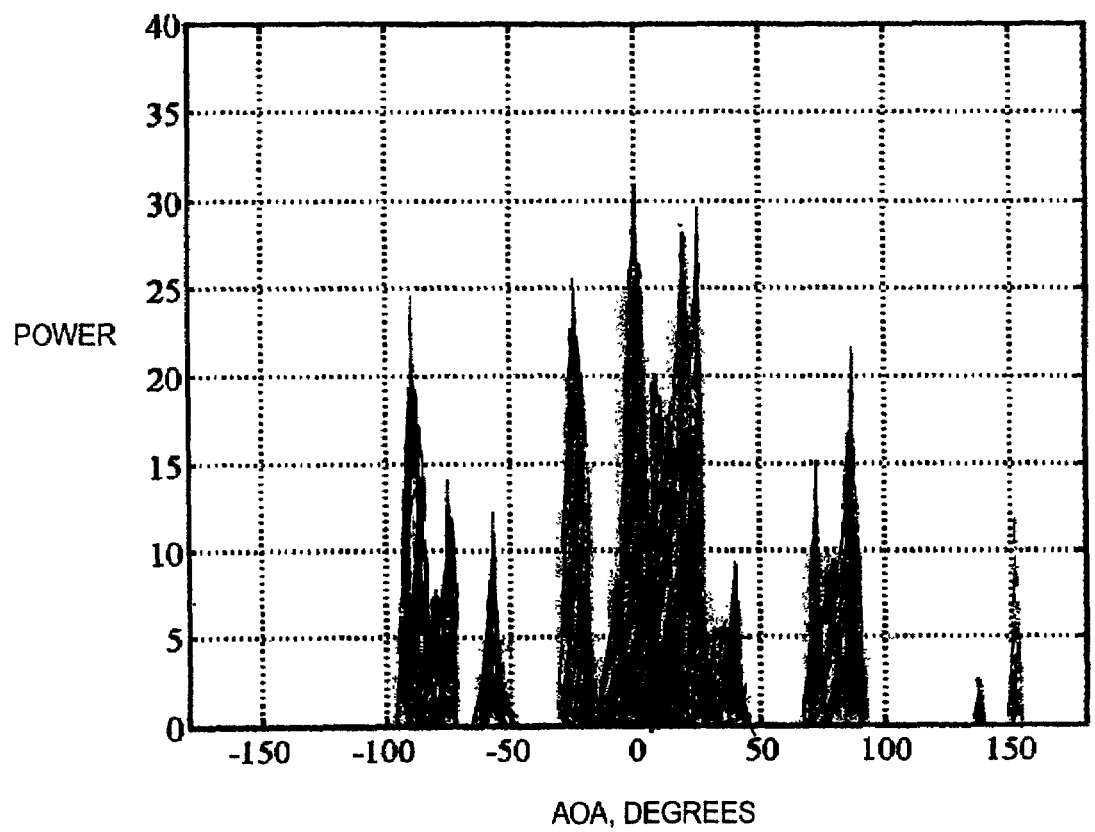
FIG. 7 is a plot showing the power-angle profile of the geometrically based single bounced (GBSB) channel model for the base station.
FIG. 8 is a diagram showing the parameters used for simulation of the multipath channel.

FIG. 7 demonstrates a typical power-angle profile generated using the channel model introduced above. The parameters used in the simulation in this channel model are shown in FIG. 8.

Step S2: estimation of number of beams and the corresponding angle of each beam

Figure 9:
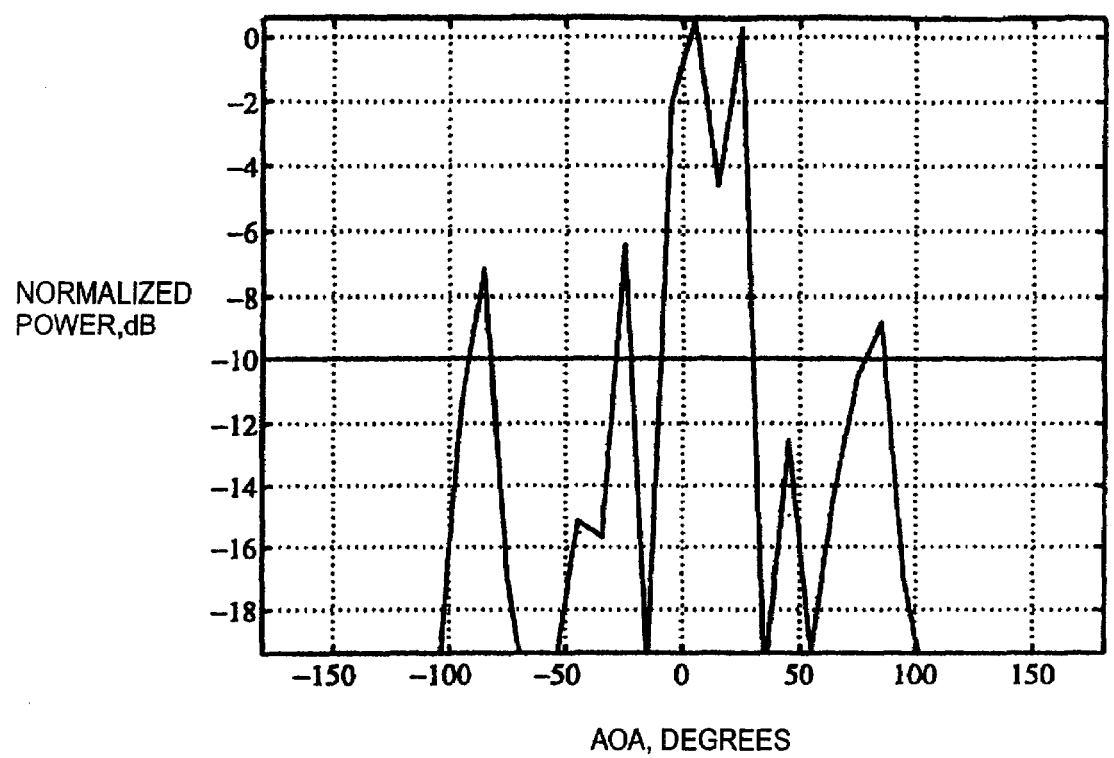
FIG. 9 is a diagram showing the estimated power received by the array antenna of the base station in the simulated channel model of the multipath environment.

FIG. 9 shows the estimated CSGP from the channel response indicated in FIG. 7 using $N_b$=36. The figure is normalized for maximum gain of 0 dB. As indicated in FIG. 9, the result of switched beamforming is a piecewise linear function of angle, that is, $H_s(\theta)$ for −180 degrees $<=\theta<180$ degrees. The next step is to distinguish the peak points of this function, which is done by discrete differentiation of $H_s(\theta)$ for values which are larger than a selected threshold level $H_{th}$.

Figure 10:
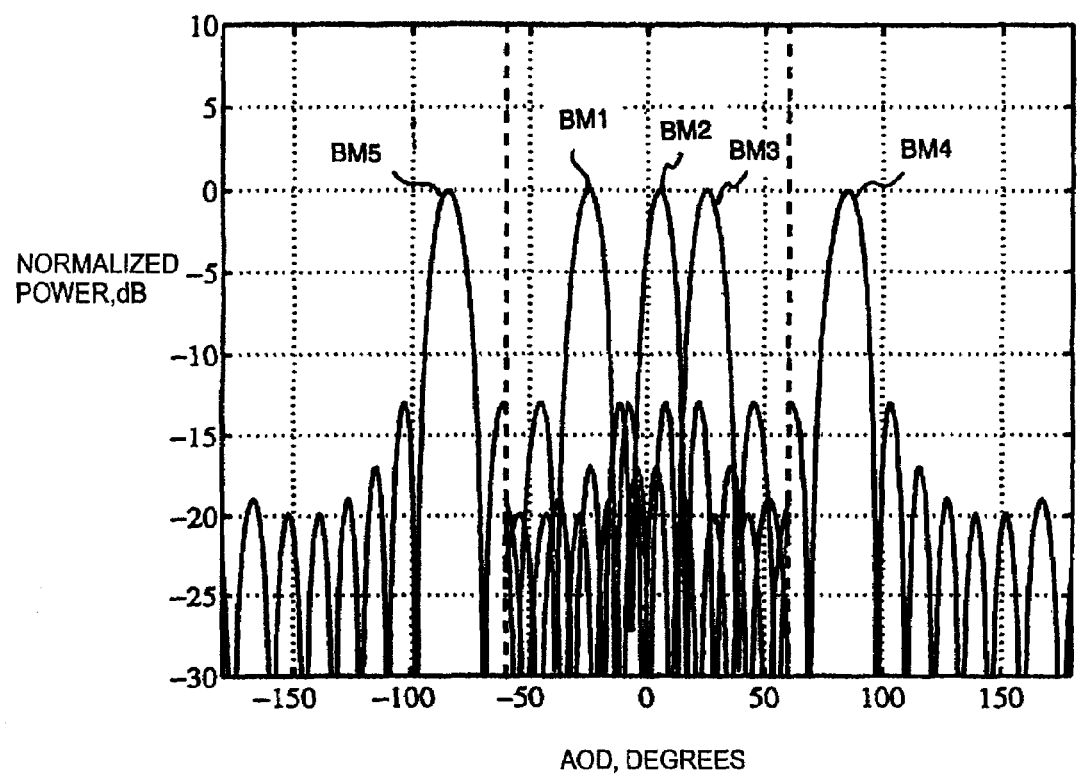
FIG. 10 is a diagram showing the normalized beam pattern according to the estimated channel response.

FIG. 10 shows an example of a beam pattern of the base station transmitter beamforming network, for $H_{th}=-10$ dB. As shown in FIG. 10, five beams, with angles of departure (AOD) of −85, −25, 5, 25 and 85 degrees are selected based on the data obtained from FIG. 9.

According to the procedures described above, the spatial channel is characterized by the number of beams and the corresponding beam angles. The main task of the base station transmitter, that is, the beam space-time block coding according to the selected number of beams, will be described bellow.

Step S3: BSTB coding of signals

The beam space-time block coding method utilized in the communication system of the present embodiment, is based on the conventional multiple antenna block coding. But in the communication system of the present embodiment, the coding is done for beams of an array antenna, not for diversity antenna systems. In addition, the number of beams which determines the coding complexity, is assigned adaptively based on the channel characteristics. Hence, this method is actually an adaptive BSTB coding technique.

For purpose of simulation, the number of transmit beams is limited to a maximum of four beams. In addition, 8-PSK modulation is used whenever three or four beams are transmitted, making the transmission rate always at least equal to two bits/symbol (bps). Note that the parameters of the GBSB channel model is set as indicated in FIG. 8, where L is the number of multipath components, $d_0$ is the distance between the base station and the mobile station, and $H_{th}$ is the gain threshold in dB.

The beam pattern shown in FIG. 10 is an example of the beam pattern used for simulation in the present embodiment. As shown in FIG. 10, 5 beams are selected to transmitting signals from the base station to the mobile station. Here, it is assumed that the beam pattern is generated by the array antenna shown in FIG. 3, that is, the array antenna constituted by three array sectors 12-1, 12-2 and 12-3. In addition, the beams BM1, BM2 and BM3 are generated by the sector 12-1, the beam BM 4 is generated by the sector 12-2, and the beam BM5 is generated by the sector 12-3.

Figure 11:
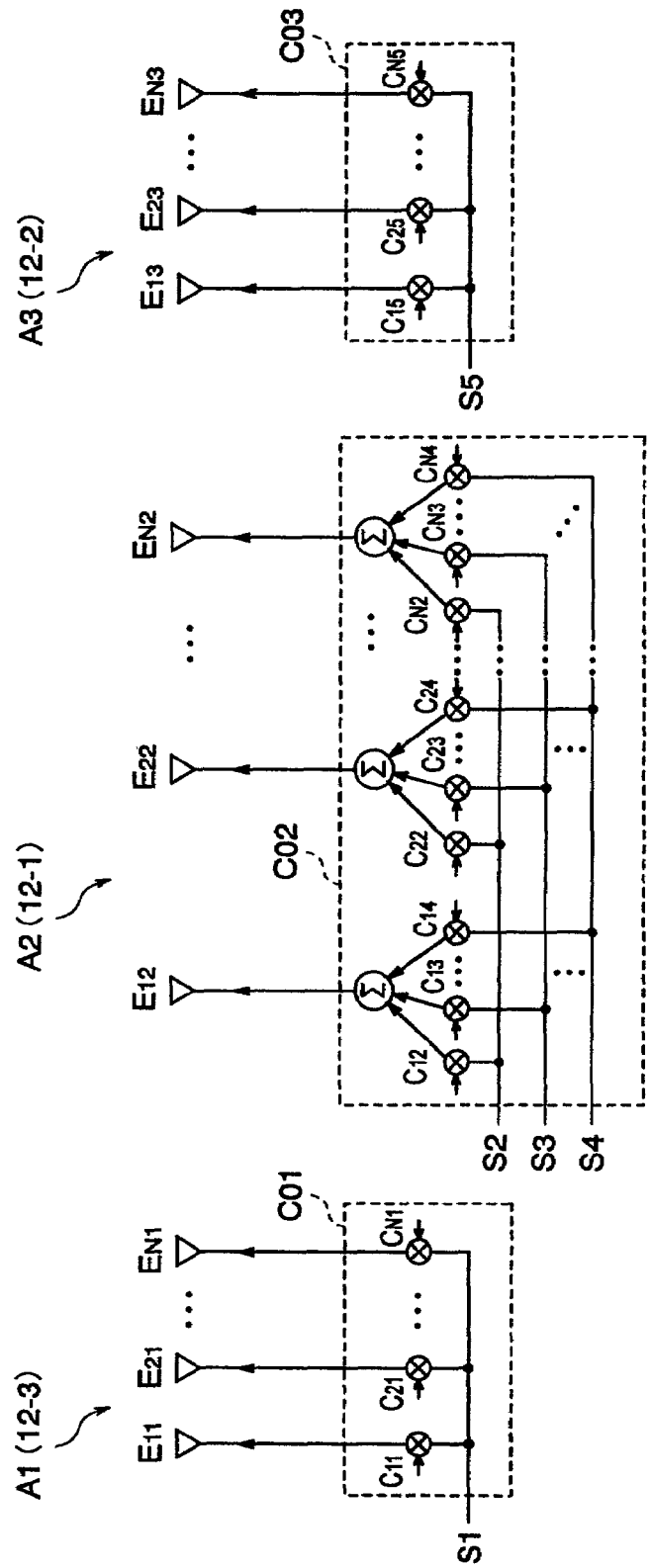
FIG. 11 is a diagram showing the beamformer for transmitting the beam space-time block (BSTB) encoded signals in the base station.

FIG. 11 is a diagram showing the beamformer 104 in the base station 10. As illustrated, for example, the BSTB encoded signal to be transmitted by the array antenna A1 (12-3) is s1, the encoded signals to be transmitted by the array antenna A2 (12-1) are s2, s3 and s4, and the encoded signal to be transmitted by the array antenna A3 (12-2) is s5.

Assuming that the array antenna A1 transmits the signal s1 by only one beam, for example, the beam BM5 as shown in FIG. 10, the array antenna A2 transmits the signals s2, s3 and s4 by three beams, for example, the beam BM1, BM2 and BM3 as shown in FIG. 10, and the array antenna A3 transmits the signal s5 by one beam, for example, the beam BM4 as shown in FIG. 10.

In the array antenna A1, the beamforming of the beam BM5 is performed by a set of coefficients $c_{11}, c_{21}, \ldots, c_{N1}$ corresponding to the antenna elements $E_{11}, E_{21}, \ldots, E_{N1}$, while in the array antenna A3, the beamforming of the beam BM4 is performed by a set of coefficients $c_{15}, c_{25}, \ldots, c_{N5}$ corresponding to the antenna elements $E_{13}, E_{23}, \ldots, E_{N3}$. And in the array antenna A2, the beamforming of the beams BM1, BM2 and BM3 are performed by three sets of coefficients $c_{12}, c_{22}, \ldots, c_{N2}, c_{13}, c_{23}, \ldots, c_{N3}$, and $c_{14}, c_{24}, \ldots, c_{N4}$, respectively, wherein the coefficients $c_{12}, c_{13}$ and $c_{14}$ correspond to the antenna element $E_{12}$, the coefficients $c_{22}, c_{23}$ and $c_{24}$ correspond to the antenna element $E_{22}$, and the coefficients $c_{N2}, c_{N3}$ and $c_{N4}$ correspond to the antenna element $E_{N2}$.

As shown in FIG. 11, three beamformers CO1, CO2 and CO3 are provided for transmitting of the BSTB encoded signals s1, s2, s3, s4 and s5. The signal s1 is input to the beamformers CO1 and the output signals are applied to the antenna elements $E_{11}, E_{21}, \ldots, E_{N1}$ of the array antenna A1, the signals s2, s3 and s4 are input to the beamformer CO2 and the output signals are applied to the antenna elements $E_{12}, E_{22}, \ldots, E_{N2}$ of the array antenna A2, and the signal s5 is input to the beamformer CO3 and the output signals are applied to the antenna elements $E_{13}, E_{23}, \ldots, E_{N3}$ of the array antenna A3.

In the beamformer CO1, the beamforming is performed by multiplying the input signal s1 by the coefficients $c_{11}, c_{21}, \ldots, c_{N1}$, respectively. Similarly, in the beamformer CO3, the beamforming is performed by multiplying the input signal s5 by the coefficients $c_{15}, c_{25}, \ldots, c_{N5}$, respectively.

In the beamformer CO2, as shown in FIG. 11, the beamforming is performed by adding the multiplication of the signals s2, s3 and s4 by the coefficients corresponding to each antenna elements $E_{12}, E_{22}, \ldots, E_{N2}$ and output the sum to each antenna element.

Figure 12:
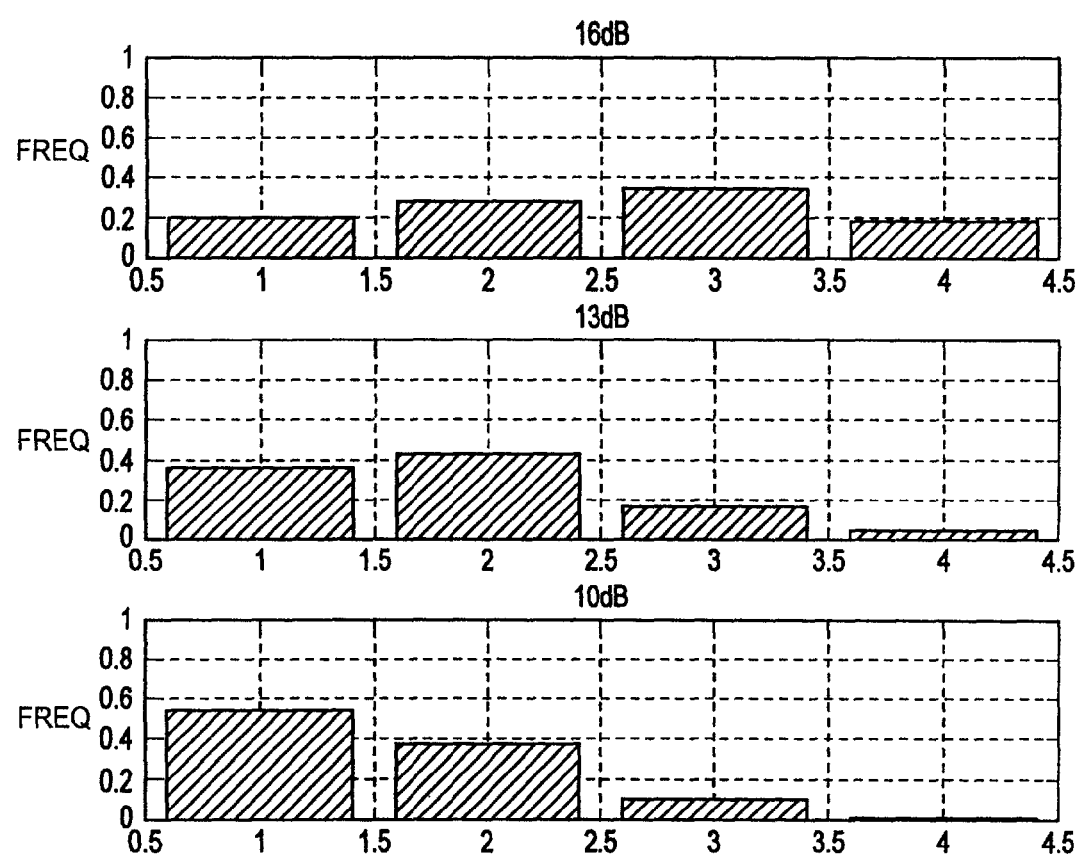
FIG. 12 is a diagram showing the histogram of the number of beams with multipath components uniformly distributed in the range of 4 to 10 and the threshold of 10, 13 and 16 dB below the maximum gain.
Figure 13:
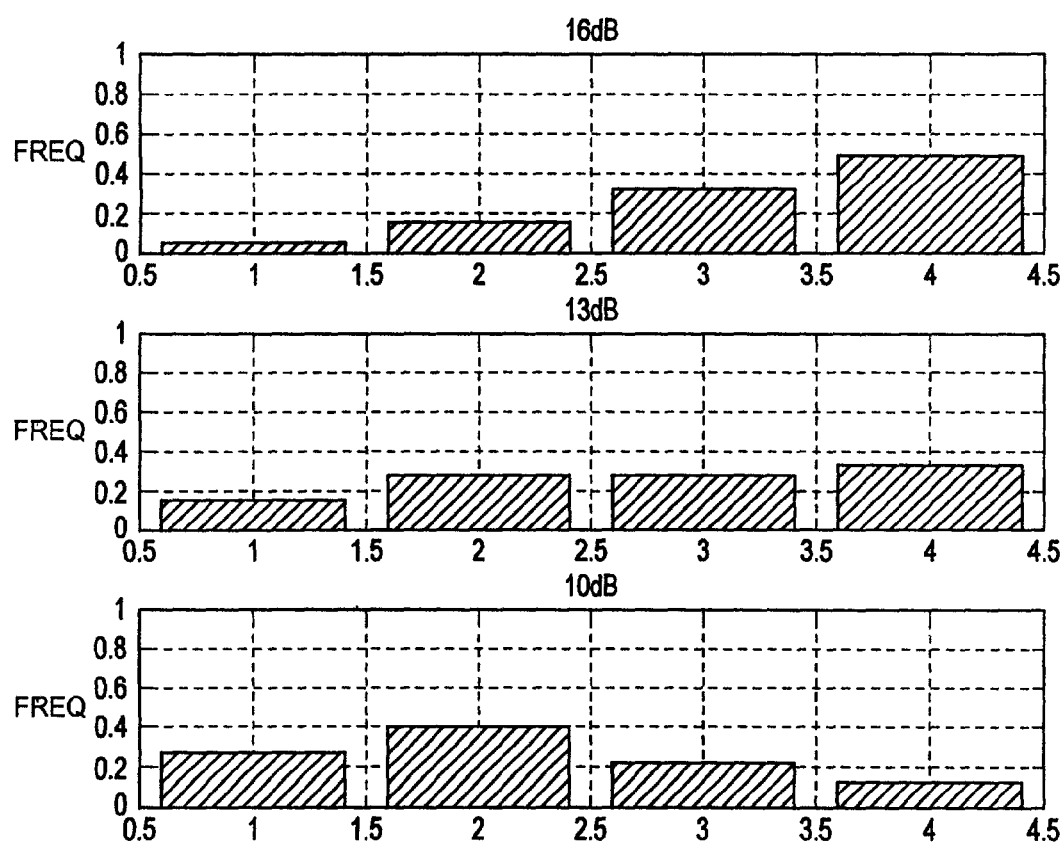
FIG. 13 is a diagram showing the histogram of the number of beams with multipath components uniformly distributed in the range of 11 to 25 and the threshold of 10, 13 and 16 dB below the maximum gain.
Figure 14:
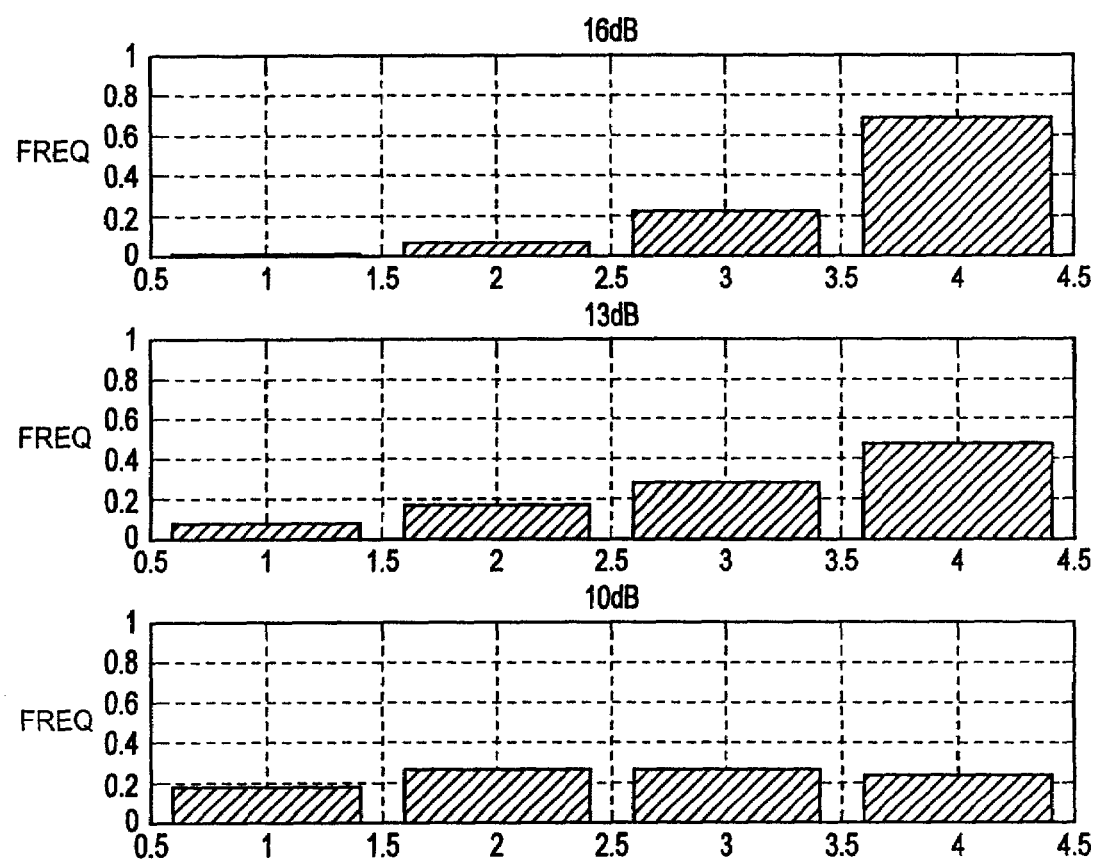
FIG. 14 is a diagram showing the histogram of the number of beams with multipath components uniformly distributed in the range of 26 to 40 and the threshold of 10, 13 and 16 dB below the maximum gain.

In the communication system of the present embodiment, there is provided a method of determining the number of the beams used for BSTB coding as a function of the number of multipath components L and the gain threshold $H_{th}$. FIGS. 12, 13 and 14 show the relative frequency of the number of the beams for values of threshold $H_{th}$=10, 13 and 16 (dB) and increasing number of multipath components L. As the threshold value is increased, more beams are assigned for transmission, resulting in increased diversity, compared to the case of two-beam transmission.

In addition, these figures indicate that greater advantage is achieved with the proposed method in rich multipath environments. As an example, FIG. 13 shows the case with number of multipath components uniformly distributed between 11 paths and 25 paths. As the threshold value is increased from 10 dB to 13 dB, the distribution of the number of beams becomes more uniform. With a threshold value of 16 dB, the distribution is such that in 50 percent of the cases, four beams are selected for transmission. Consequently, the performance will be improved, as more beam diversity is achieved.

Figure 15:
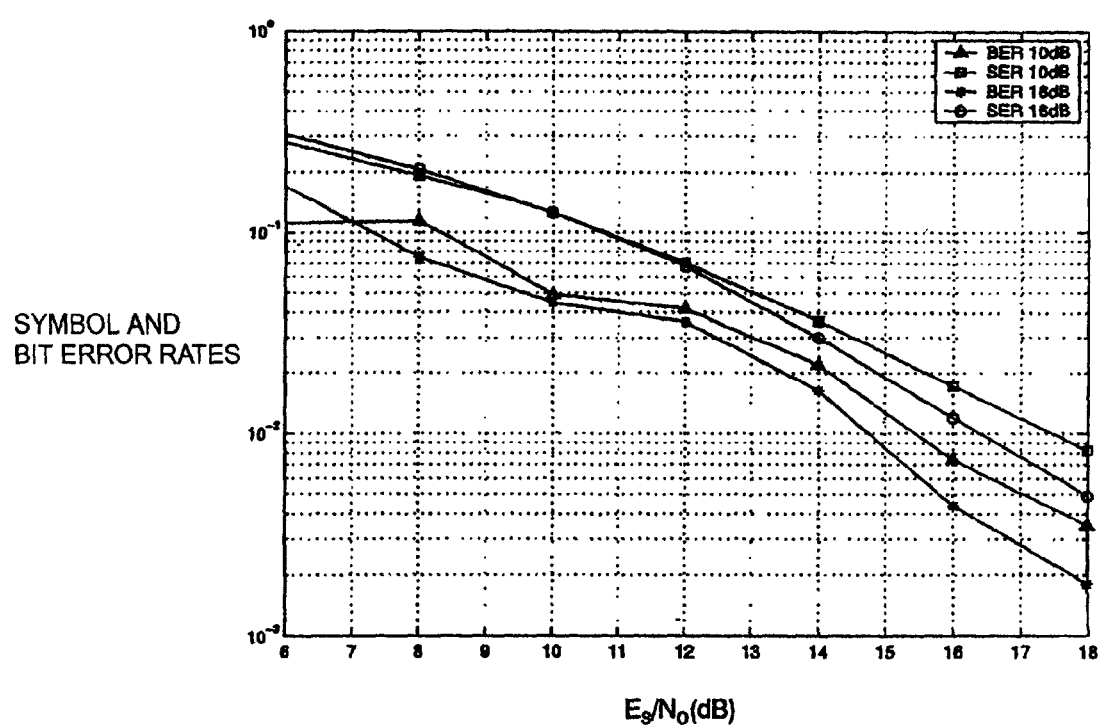
FIG. 15 is a plot showing the error performance of the BSTB coding the threshold of 10 and 16 dB.

FIG. 15 shows the error performance of the proposed coding scheme of the communication system. This figure is a plot of symbol error rate (SER) and bit error rate (BER) for the communication system with the GBSB model parameters L and $d_0$ as shown in FIG. 8. Clearly, the increased diversity results in better error performance as the parameter $H_{th}$ is increased. In the simulation results shown in FIG. 15, the average data rate is 2.205340 bps and 2.101577 bps, for $H_{th}$=10 dB and $H_{th}$=16 dB, respectively.

According to the transmitter and the communication system of the present invention, an adaptive scheme for assignment of the number of employed beams for downlink transmission in an indoor mobile communication system is proposed. The required data for determination of this number are obtained by a triangular sectored switched array antenna at the base station which provides a rough estimation of the channel environment. The number of peak points of this estimation with respect to a prescribed threshold level gives the required beams through the whole azimuth angles.

With using the estimated beam number, the adaptive beam diversity according to the beam space-time block coding of the downlink transmission can be achieved. The simulation results show that increasing the threshold value, hence, increasing the number of beams in average, the performance of the proposed communication system improves because of more diversity. In addition, the average data rate is also increased by using more beams in downlink communication.

Further more, since the array antennas formed by three arrays covers 360 degrees around the base station, the communication system of the present invention can be an advantageous approach in indoor communication system with a large angular spread.

Note that the present invention is not limited to the above embodiments and includes modifications within the scope of the claims.

What is claimed is:

1. A transmitter for transmitting signals from a base station to a mobile station through a transmission channel, comprising:
   an array antenna including a plurality of antenna elements coupled to a beam-forming network,
   a first estimating means for estimating a channel spatial gain pattern according to an output power of the beam-forming network of the array antenna,
   a second estimating means for estimating the number of beams and a corresponding angle for each beam for transmitting the signals according to the estimated channel spatial gain pattern, and
   an encoding means for performing channel coding of the signals to be transmitted and transmitting the encoded signals through the array antenna.

2. A transmitter as set forth in claim 1, wherein:
   the second estimating means estimates the number of beams in accordance with a number of multipath components of the channel and a gain threshold.

3. A transmitter as set forth in claim 1, wherein:
   the encoding means performs space-time block coding using multiple beams of the array antenna.

4. A method for transmitting a signal by using a transmitter including an array antenna from a base station to a mobile station through a transmission channel, comprising:
- a first step for estimating a channel spatial gain pattern according to an output power of a beam-forming network coupled to the array antenna,
- a second step for estimating the number of beams and a corresponding angle for each beam for transmitting the signal according to the estimated channel spatial gain pattern, and
- a third step for performing channel coding of the signal to be transmitted and transmitting the encoded signal through the array antenna.

5. A method as set forth in claim 4, wherein:
the second step estimates the number of beams in accordance with a number of multipath components of the channel and a gain threshold.

6. A method as set forth in claim 4, wherein:
the third step performs space-time block coding using multiple beams of the array antenna.

7. A communication system comprising:
- a transmitter including:
- an array antenna constituted by a plurality of antenna elements,
- a beam-forming network coupled to the array antenna,
- a first estimating means for estimating a channel spatial gain pattern according to an output power of the beam-forming network of the array antenna,
- a second estimating means for estimating the number of beams and a corresponding angle for each beam for transmitting signals according to the estimated channel spatial gain pattern, and
- an encoding means for performing channel-coding of the signals to be transmitted and transmitting the encoded signals through the array antenna, and
- a receiver including:
- an antenna means for receiving the encoded signals, and
- a decoding means for performing channel decoding of the received signals.

8. A communication system as set forth in claim 7, wherein:
the second estimating means of the transmitter estimates the number of beams in accordance with a number of multipath components of a channel, used to transmit the signals, and gain threshold.

9. A communication system as set forth in claim 7, wherein:
the encoding means of the transmitter performs space-time block coding using multiple beams of the array antenna.

10. A communication system as set forth in claim 7, wherein:
the decoding means of the receiver decodes the received signals by beam space-time block decoding.

11. A communication system as set forth in claim 7, wherein:
the decoding means of the receiver decodes the received signals by a maximum likelihood decoding algorithm.

* * * * *